(12) United States Patent
Shen

(10) Patent No.: US 7,146,610 B2
(45) Date of Patent: Dec. 5, 2006

(54) METHOD FOR UPGRADING SOFTWARE COMPONENTS WITHOUT SYSTEM SHUTDOWN

(75) Inventor: You-Wei Shen, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 627 days.

(21) Appl. No.: 10/400,328

(22) Filed: Mar. 27, 2003

(65) Prior Publication Data
US 2004/0194078 A1 Sep. 30, 2004

(51) Int. Cl.
*G06F 9/44* (2006.01)
(52) U.S. Cl. .............. 717/170; 717/168; 717/169
(58) Field of Classification Search ........ 717/168–172, 717/174–177; 719/315, 320, 330–332, 329; 707/10; 710/104
See application file for complete search history.

(56) References Cited

U.S. PATENT DOCUMENTS

| | | | |
|---|---|---|---|
| 5,761,499 A * | 6/1998 | Sonderegger | 707/10 |
| 6,341,321 B1 * | 1/2002 | Glassen et al. | 710/104 |
| 6,470,227 B1 * | 10/2002 | Rangachari et al. | 700/95 |
| 6,701,441 B1 * | 3/2004 | Balasubramaniam et al. | 726/25 |
| 6,745,224 B1 * | 6/2004 | D'Souza et al. | 709/202 |
| 6,986,148 B1 * | 1/2006 | Johnson et al. | 719/332 |
| 2002/0112232 A1 * | 8/2002 | Ream et al. | 717/176 |
| 2003/0126592 A1 * | 7/2003 | Mishra et al. | 717/176 |
| 2003/0135660 A1 * | 7/2003 | Mortazavi | 709/315 |
| 2003/0145126 A1 * | 7/2003 | Weightman | 709/320 |

\* cited by examiner

*Primary Examiner*—Wei Zhen
*Assistant Examiner*—Anna Deng
(74) *Attorney, Agent, or Firm*—Slater & Matsil, L.L.P.

(57) ABSTRACT

In an operating software system that provides one or more software components for use by a plurality of software programs, a method of providing an upgraded version of a software component for use by one or more of the software programs while at the same time allowing other programs of the plurality of programs to continue to operate with the older version. The method is particularly suitable for upgrading Component Object Models (COM's) as used in the Windows® operating system.

13 Claims, 3 Drawing Sheets

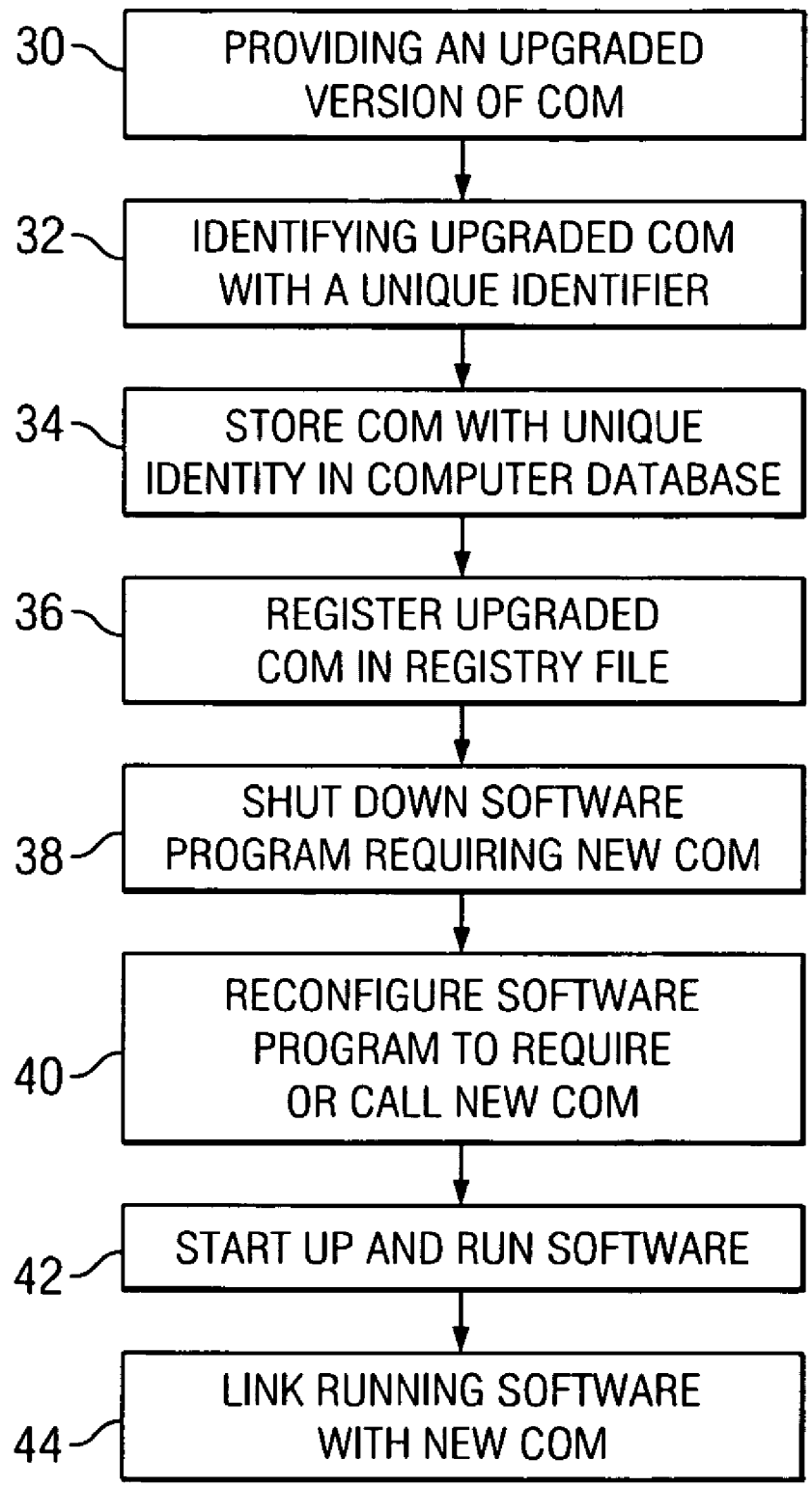

METHOD FOR UPGRADING SOFTWARE COMPONENTS WITHOUT SYSTEM SHUTDOWN

TECHNICAL FIELD

The present invention relates generally to a method of upgrading software components or modules used by a multiplicity of software programs without having to shut down all of the software programs that require the software component. More specifically, this invention relates to a software arrangement using a Component Object Model (COM) used by a multiplicity of different Client Applications (software) and subsequently providing an upgraded version of the COM for use by at least one of the multiplicity of Client Applications without having to shut down the remaining Client Applications of said multiplicity that do not require the updated version.

BACKGROUND

The Microsoft® Corporation has developed a platform-independent, distributed, object-oriented system for creating binary software components that can interact. This system is commonly referred to as Component Object Model or COM, and is the foundation technology for Microsoft's OLE (compound documents), ActiveX® (Internet-enabled components), as well as others.

To understand the COM concept, it is note that COM is not an object-oriented language but a standard. Further, COM does not specify how an application should be structured. Language, structure, and implementation details are left to the application programmer. COM on the other hand does specify an object model and programming requirements that enable COM objects (also called COM components, or simply objects) to interact with other objects. The "objects" can be within a single process, in a variety of processes, and can even be on remote machines. They can even be written in different languages, and may be structurally quite dissimilar. Thus, COM is referred to as a binary standard and applies after a program has been translated to binary machine code.

The only language requirement for COM is that the code defining the COM be generated in a language that can create structures of pointers and either explicitly or implicitly, call functions through pointers. For example, object-oriented languages such as Microsoft® Visual C++® and Smalltalk provide programming mechanisms that simplify the implementation of COM objects, but languages such as C, Pascal, Ada, Java, and even BASIC programming environments can also create and use COM objects.

In general, a software object is made up of a set of data and the functions that manipulate the data. A COM object on the other hand is one in which access to an object's data is achieved exclusively through one or more sets of related functions. These function sets are called interfaces, and the only way to gain access to an interface is through a pointer to the interface. Besides specifying the basic binary object standard, COM defines certain basic interfaces that provide functions common to all COM-based technologies, and it provides a small number of API functions.

The concept of using COM objects and interfaces allows objects to interact across process and machine boundaries as easily as within a single process. The use of such common modules enables the manipulation of data associated with an object through an interface on the object. COM uses the word interface in a sense different from that typically used in Visual C++ programming. A C++ interface refers to all of the functions that a class supports and that clients of an object can call to interact with it. A COM interface refers to a predefined group of related functions that a COM class implements, but a specific interface does not necessarily represent all the functions that the class supports. Referring to an object implementing an interface means that the object uses code that implements each method of the interface and provides COM binary-compliant pointers to those functions to the COM library. COM then makes those functions available to any client who asks for a pointer to the interface, whether the client is inside or outside of the process that implements those functions.

The COM concept makes a fundamental distinction between interface definitions and their implementations. An interface is actually a contract that consists of a group of related function prototypes whose usage is defined but whose implementation is not. These function prototypes are equivalent to pure virtual base classes in C++ programming. An interface definition specifies the interface's member functions and what they must do. There is no actual implementation associated with an interface. An interface implementation on the other hand is the code supplied to carry out the actions specified in an interface definition.

Simple objects support only a single interface. More complicated objects, such as embeddable objects, typically support several interfaces. Client applications have access to a COM object only through a pointer to one of its interfaces, which, in turn, allows the client application to call any of the methods that make up that interface. These methods determine how a client can use the object's data.

An important aspect of the COM concept is how client applications and servers interact. A COM client application is whatever code or object gets a pointer to a COM server and uses its services by calling the methods of its interfaces. A COM server is any object that provides services to clients; these services are in the form of COM interface implementations that can be called by any client that is able to get a pointer to one of the interfaces on the server object. There are two main types of servers, and can be classified as in-process and out-of-process servers. In-process servers are implemented in a dynamic linked library (.DLL), and out-of-process servers are implemented in an executable file (.EXE). .DLL and .EXE files will be recognized by anyone familiar with Microsoft® Windows® software. Out-of-process servers can reside either on the local machine or on a remote machine. In addition, the COM concept provides a mechanism that allows an in-process server (a .DLL) to run in a surrogate .EXE process to gain the advantage of being able to run the process on a remote machine.

A well-known example of the COM concept with respect to an .EXE program is "spell checker" in MS Office. Spell Checker is a single software component that can be called on by the word processing program or any other of the programs in MS Office.

A dynamic-link library (.DLL) on the other hand, is a module that contains functions and data that can be used by another module (application or .DLL).

For example, a .DLL can define two kinds of functions: exported and internal. The exported functions may be called by other modules, as well as from within the .DLL where they are defined. Internal functions are typically called only from within the .DLL where they are defined. Although a .DLL can export data, its data is generally used only by its functions. However, there is nothing to prevent another module from reading or writing that address.

.DLLs provide a way to modularize applications so that functionality can be updated and reused more easily. They also help reduce memory overhead when several applications use the same functionality at the same time, because although each application gets its own copy of the data, they can share the code.

The Windows® application programming interface (API) is implemented as a set of dynamic-link libraries, so any process that uses the Windows® API uses dynamic linking.

Dynamic linking allows a module to include only the information needed to locate an exported.DLL function at load time or run time. Dynamic linking differs from the more familiar static linking, in which the linker copes a library function's code into each module that calls it.

A .DLL can be called during loading or running a program. In load-time dynamic linking, a module makes explicit calls to exported .DLL functions as if they were local functions. This requires linking the module with the import library for the .DLL that contains the functions. An import library supplies the system with the information needed to load the .DLL and locate the exported .DLL functions when the application is loaded. The threads of the process that called the .DLL can use handles operated by a .DLL function. Similarly, handles opened by any thread of the calling process can be used in the .DLL function. The .DLL uses the stack of the calling thread and the virtual address space of the calling process. The .DLL allocates memory from the virtual address space of the calling process.

Programming models and constructs using COM allow COM clients and servers to work together across the network, not just within a given machine. This enables existing applications to interact with new applications and with each other across networks with proper administration, and new applications can be written to take advantage of networking features. It is not necessary for COM client applications to be aware of how server objects are packaged. For example, they may be packaged as in-process objects (in .DLLs) or as local or remote objects (in .EXEs). The COM concept is designed for location transparency that extends across a network. This allows applications written for single machines to run across a network and provides features that extend these capabilities and adds the security necessary in a network. More specifically, there are nearly 200 Microsoft® Windows® defined COM interfaces and tens of thousands COM components overall. In most cases, these generic interfaces can be re-used. However, some applications have specific requirements that make it desirable or necessary to define specific object interfaces.

The Microsoft® Windows® registry is the system database for Windows® operating systems. It contains information about the configuration of system hardware and software as well as about users of the system. Any Windows®-based program can add information to the registry and read information back from the registry. While writing a new program, programmers often search the registry for interesting components to use.

Thus, the registry maintains information about all the COM objects installed in the system. Whenever an application creates a COM component, the registry is consulted to resolve either the CLSID (Class's ID) or ProgID of the component into the pathname of the server .DLL or .EXE that contains it. A CLSID is a generated 128 bit unique identifier or UUID as defined by the DCE organization. A UUID is a randomly-generated unique ID, and an interface ID or IID as well as a CLSID. The ProgID is a string identifier that the client program can use to resolve possible CLSID's. The COM system may use any of these three ID's (CLSID, IID and ProgID). After determining the component's server, Windows® either loads the server into the process space of the client application (in-process components) or starts the server in its own process space (local and remote servers). The server creates an instance of the component and returns to the client a reference to one of the component's interfaces.

Additional information concerning Mircosoft® COM system may be found on the internet at http://msdn.microsoft.com/library/default.asp?url=/library/en-us/com/comportal_3qn9. asp, and http://msdn.microsoft.com/library/default.asp?url=/library/en-us/dllproc/base/dynamic_link_libraries.asp.

SUMMARY OF THE INVENTION

A method for upgrading a software component such as a COM (Component Object Model) as used by Microsoft® Windows® operating system and having a first file name. The software component is used by a multiplicity of software programs or client applications without shutting down the computer software operating system. The operating system will include a database such as the system registry file as used by Windows®.

The method comprises assigning a second file name to the new software component or module (COM) that is to be used as the upgraded version. This upgraded module or component with the second file name is then stored in a directory in the computer storage. The upgraded component with the second file name is also registered in the system's database. After storing the new component and registering the second file name, the software program or client application that is to use the upgraded software component is shut down and reconfigured so as to require the upgraded software component or COM under the second file name. The client application or software program is then run according to normal procedure and is linked to the software component (COM) having the second file name.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

DESCRIPTION OF THE DRAWINGS

For a more complete understanding of the present invention, and the advantages thereof, reference is now made to the following descriptions taken in conjunction with the accompanying drawing, in which:

FIG. 3 is a flow diagram of the process of the present invention as illustrated in FIGS. 2A, 2B and 2C.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a component used in a Windows® operating system or provided by the Microsoft® Corporation. The invention may also be applied, however, to other software arrangements.

Figure 1A:
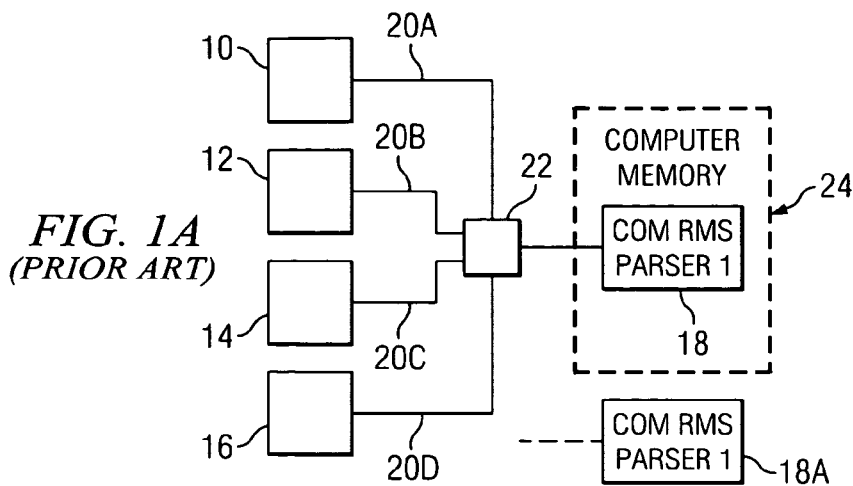
FIGS. 1A, 1B and 1C are schematics illustrating the prior art process of upgrading a software component such as a COM used by a multiplicity of software programs such as client applications.
Figure 1B:
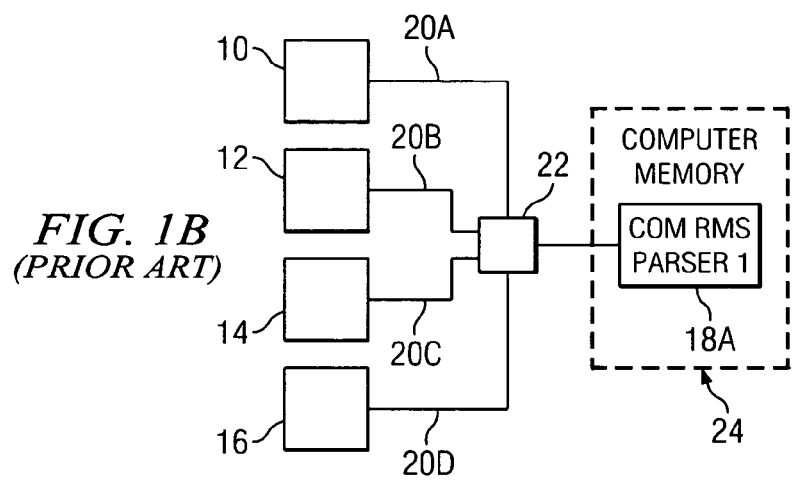
Figure 1C:
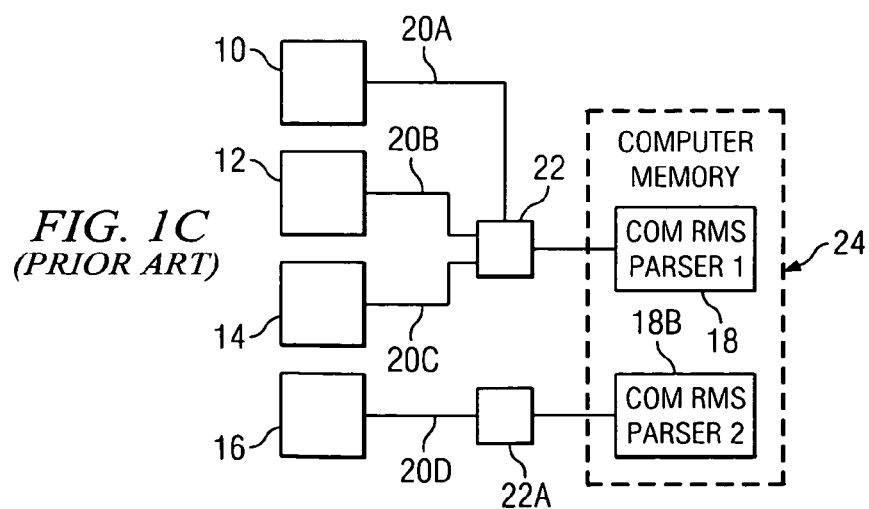

Referring now to FIGS. 1A, 1B and 1C, there is illustrated the prior art processes of upgrading a software component, such as for example a COM module used by a plurality of programs or "client applications." As shown in FIG. 1A, four software programs or client applications 10, 12, 14 and 16 are functionally linked to a single COM module or software component 18 having a selected file name such as, for example only, RMS Parser 1 as indicated by solid line links 20A, 20B, 20C and 20D through interface node 22. The COM module is stored in computer memory 24. If an upgrade version of the COM module (RMS parser 1) 18A is necessary for software program (or client application) 16 to improve performance, or if client application 16 itself is to be upgraded so as to require an upgraded version of the COM module (RMS Parser 1), such a change was accomplished in the past by shutting down all of the software client applications 10, 12, 14 and 16 that required the COM module named RMS Parser 1.

The old version of RMS Parser 1 (18) was then deleted from memory 24 and the new version of Parser 1 (18A) was then stored in computer memory 24 under the same name and address as indicated in FIG. 1B. The four programs that were shut down for this replacement were then restarted. This process was the same whether or not the new version of software component (COM) 18A (still named RMS parser 1) provided any benefit to programs 10, 12 and 14, which do not require the upgraded versions (i.e., operated quite satisfactory with the old version). In addition to the obvious disadvantage of the unnecessary cost of shutting down all of the client applications that worked well with the old version COM RMS Parser 1 (18) to avoid problems, the operating system would lock the file when the client applications were running whether or not they were actually being used at that time by the specific COM to be upgraded. Thus, such upgrades typically were required to take place during scheduled down-time.

A shut down of all programs or client applications 10, 12, 14 and 16 was also necessary even when the new software component or COM required by program 16 was so different it required a new name (for example RMS parser 2) and could not be used by the other programs 10, 12 and 14, which remained linked to COM RMS Parser 1 (18). FIG. 1C illustrates the resulting arrangement of programs 10, 12 and 14 still linked to old version COM RMS Parser 1 18 stored in memory 24 while program 16 is linked to the new COM RMS Parser 2 (18A) also stored in the computer memory 24.

Figure 2A:
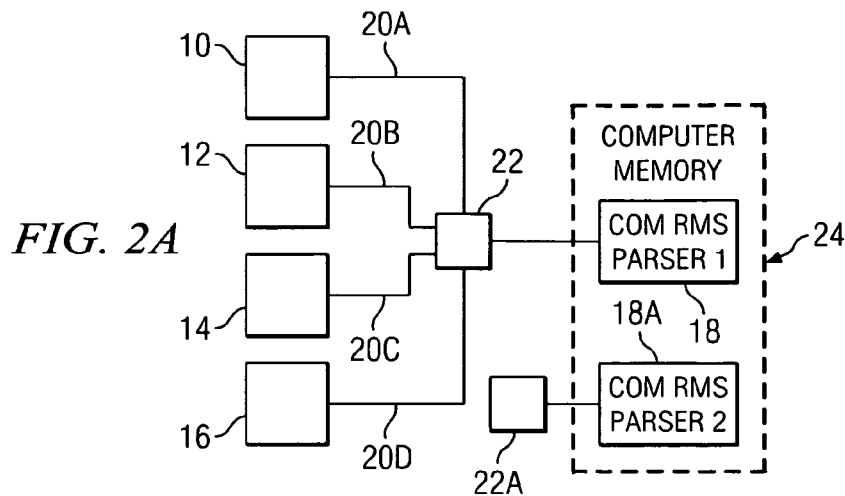
FIGS. 2A, 2B and 2C are schematics illustrating the process of upgrading a software component used by a multiplicity of software programs according to the teachings of the present invention.
Figure 2B:
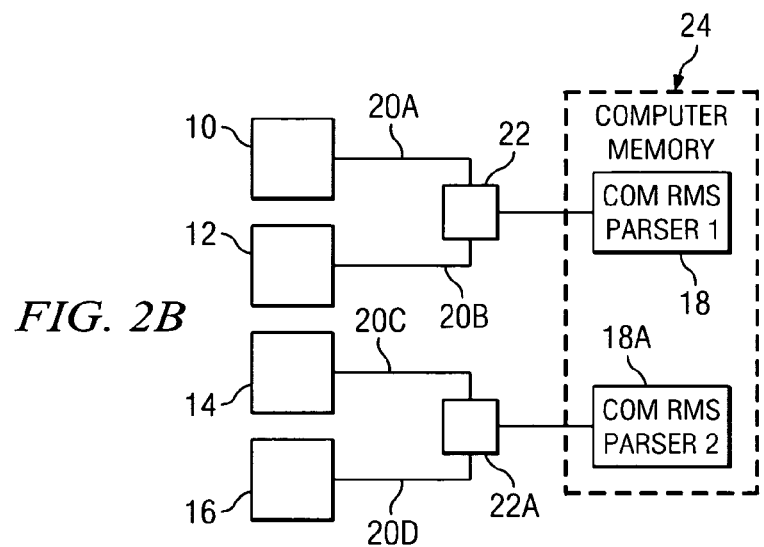
Figure 2C:
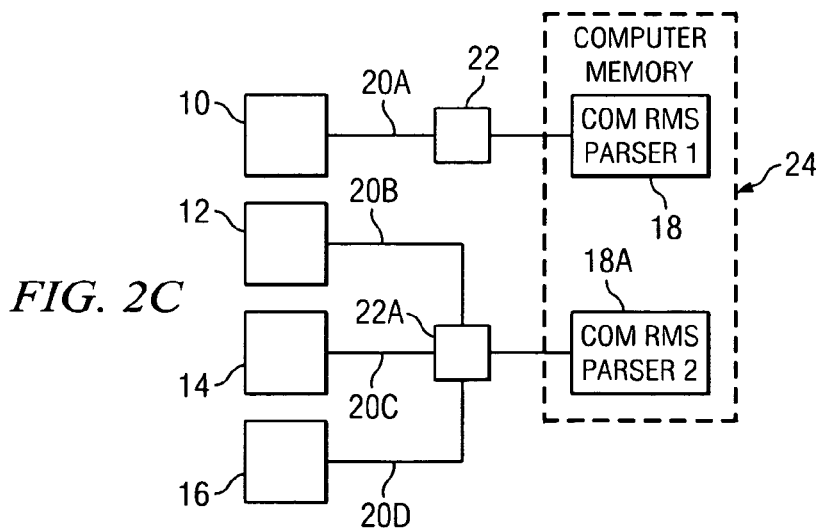

Referring now to FIGS. 2A, 2B and 2C there are illustrated the process of the present invention. (Those elements that are the same as used in FIGS. 1A, 1B and 1C retain the same reference numbers.) As shown in FIG. 2A, the upgraded software component or COM version 18A may be stored in computer memory 24 under an appropriate directory with a different name (i.e., RMS Parser 2 rather than RMS parser 1) and registered in the software database as a registry file. It is also noted that the upgraded COM has its own interface node(s) 22A. In the example of FIGS. 2A and 2B, the system may then be shut down and client applications 14 and 16 reconfigured so as to now require RMS Parser 2 rather than RMS parser 1. The system is then started back up with client applications 14 and 16 using RMS Parser 2 while client applications 10 and 12 continue to operate using RMS parser 1. When the system is restored, the software component or COM 18 and 18A will now be unlocked as shown even though still in use.

This inventive process may be more clearly illustrated by now referring to FIGS. 2B and 2C, wherein client applications or software programs 10 and 12 are linked to software component or COM named "RMS parser 1" having reference number 18 and stored in computer memory 24 whereas client applications 14 and 16 are linked to software component or COM 18A named "RMS parser 2" also stored in computer memory 24 as shown in FIG. 2B. Further, the components are no longer "locked" since an upgrade does not require removing the COM module from the system when it is to be replaced with a new module.

Therefore, if as an example, it also becomes desirable to upgrade client application 12 to RMS Parser 2 while client application 10 continues to operate with RMS Parser 1 (18), it is only necessary to shut down client-application 12 and reconfigure it to require RMS Parser 2 (18A) rather than RMS Parser 1 (18) and then restart the program so that it now links to RMS Parser 2 (18A). Thus, client application 10 may continue to operate through the complete upgrade process for client application 12. If in the future client application 10 is also to be upgraded, a process similar to that used for upgrading client application 12 is simply repeated. Now if all of the client applications have been switched over or upgraded; that is, there are no other client applications that require the COM version named RMS Parser 1 (18), the RMS Parser 1 (18) file may be deleted.

As mentioned, the above-described invention is especially applicable for use with a Windows® operating system, wherein the software components as referred to as Component Object Models, COM's and the software programs are referred to as client applications. Further, the Windows® operating system identifies file types by their "extensions" and two of the file types are identified with .DLL and .EXE extensions.

More specifically, in the COM architecture developed by Microsoft® Windows® a 16 byte number is used to represent the unique-identifier of a component and its interface node. This 16 byte number is the GUID (Globally Unique Identifier) and text string represents the "Program ID of the GUID. Windows® may use the Program ID to determine the GUID, which in turn identifies the specific COM component that the client application or software program requires (i.e., will call and link to). The Program ID has the following format:

"<Component Name>.<Interface Name>.<Version Number>"

As an example only, "RMSParser.Parser.1" where "RMSParser" is the component name, "Parser" is the interface name and "1" is the version number.

If the deployment is to be "seamless," the developer of the upgrade COM component should adhere to the following guidelines: First, with respect to the COM component itself, the developer assigns a totally different GUID (Globally Unique Identifier) to the upgraded version of the COM component and all interface nodes, and includes the "version number" of the upgrade. The COM component file is also renamed such that its name is different than the previous version(s). That is, in the example above, the file name was "RMSParser.Parser.1" for version 1. Therefore, the file name of the new version 2 will be "RMSParser.Parser.2."

The component definition used by the calling or requesting software program includes a GUID portion and a Program ID portion, and for the original component definition of version 1

```
HKCR
{
  RMSParser.Parser.1 = s 'Parser Class'
  {
    CLSID = s '{ABC}'
      Note: to aid in understanding, the term "ABC" represents
      the GUID of the original COM and replaces the much more
      complex actual GUID portion of an actual COM which as
      made up of a series of approximately 36 alphanumeric
      characters (e.g., ABC=Ed52C3D5-69F7-11D5-9110-
      0002B332CB84)
  }
  RMSParser.Parser = s 'Parser Class'
  {
    CLSID = s '{ABC}'
    CurVer = s 'RMSParser.Parser.1'
  }
  NoRemove CLSID
  {
    ForceRemove {ABC} = s 'Parser Class'
    {
      ProgID = s 'RMSParser.Parser.1'
        Note: "RMSParser.Parser.1" is the Program ID of
        the original version of the COM.
      VersionIndependentProgID = s 'RMSParser.Parser'
      ForceRemove 'Programmable'
      InprocServer32 = s '%MODULE%'
      {
      }
      'TypeLib' = s '{ABC}'
    }
  }
}
```

In a similar manner, the component definition of the upgraded COM version is as follows:

```
HKCR
{
  RMSParser.Parser.2 = s 'Parser Class'
  {
    CLSID = s '{XYZ}'
      Note: "XYZ" replaces the 36 alphanumeric GUID of the
      updated COM version (e.g., XYZ=a2b205af-7881-4c7d-
      ad8d-bf2acefb906b)
  }
  RMSParser.Parser = s 'Parser Class'
  {
    CLSID - s '{XYZ}'
    CurVer = s 'RMSParser.Parser.2'
  }
  NoRemove CLSID
  {
    ForceRemove {XYZ} = s 'Parser Class'
    {
      ProgID = s 'RMSParser.Parser.2'
        Note: This is the Program ID of the updated
        version of the COM.
      VersionIndependentProgID - s 'RMSParser.Parser'
```

```
-continued
      ForceRemove 'Programmable"
      InprocServer32 - s '%MODULE%'
      {
      }
      'TypeLib' - s '{XYZ}'
    }
  }
}
```

Note: The first two components of the ProgID format are the same. Namely the "VersionIndependentProgID", value is "RMSParser.Parser".

The client application or software program is configured to identify which COM version it calls or with which it links. However, if the client application is to use the newest or upgraded version, it is not necessary to identify the version. For example, in the client application or software program:
Set Parser=CreateObject("RMSParser.parser."+command) where "Command" is a parameter of the client application to indicate which version of COM component is to be used. For example, if command="2", the client application links to the newer or upgraded version of the COM component.

Referring now to FIG. 3, there is illustrated a simplified flow diagram of the method steps of the present invention. As shown, a new version or upgraded version of a software component or COM having a new name is provided and then stored in the computer system database (for example registered in the registry file) as indicated by steps 30, 32, 34 and 36. A software program or client application requiring an upgraded COM is then shut down and reconfigured to operate with the upgraded COM as indicated at steps 38 and 40. The reconfigured program is then stated up or run as indicated at step 42 and linked with the upgraded COM as indicated at step 44.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, methods and steps described in the specification. As one of ordinary skill in the art will readily appreciate from the disclosure of the present invention, processes, methods, or steps, presently existing or later to be developed, that perform substantially the same function or achieve substantially the same result as the corresponding embodiments described herein may be utilized according to the present invention. Accordingly, the appended claims are intended to include within their scope such processes, methods, or steps.

What is claimed is:

1. In a system providing a COM (Component Object Model) for use by a plurality of client applications, a method of providing an upgraded version of said COM for use by at least one of said plurality of client applications, without taking other client applications of said plurality that will not use the upgrade out of service, said method comprising the steps of:
   providing a first version of said COM with a first file name and a plurality of client applications that use said first version of said COM;
   storing an upgraded version of said COM with a second file name in a directory;
   registering said upgraded COM in a system registry file;

shutting down only said at least one client application of said plurality that will use said upgraded version of said COM while the other client applications of said plurality that will not use said upgraded version of said COM are running and then;

reconfiguring said at least one shut down client application to operate with said upgraded COM with said second file name;

running said reconfigured client application; and linking said running reconfigured client application to said COM having said second file name.

2. The method of claim 1 wherein said step of shutting down said at least one client application comprises the step of shutting down at least two client applications and reconfiguring said at least two client applications to operate with said upgraded COM.

3. The method of claim 1 wherein at least one of said plurality of client applications continues to operate with said COM identified by said first file name.

4. The method of claim 2 wherein at least one of said plurality of client applications continues to operate with said COM identified by said first file name.

5. The method of claim 1 wherein said client applications operate with a Windows® operating system that includes extensions at the end of file names to indicate the file type, and said COM is selected from the group of file types having extensions consisting of .EXE and .DLL.

6. The method of claim 2 wherein said client applications operate with a Windows® operating system that includes extensions at the end of file names to indicate the file type, and said COM is selected from the group of file types having extensions consisting of .EXE and .DLL.

7. The method of claim 3 wherein said client applications operate with a Windows® operating system that includes extensions at the end of file names to indicate the file type, and said COM is selected from the group of file types having extensions consisting of .EXE and .DLL.

8. The method of claim 4 wherein said client applications operate with a Windows® operating system that includes extensions at the end of file names to indicate the file type, and said COM is selected from the group of file types having extensions consisting of .EXE and .DLL.

9. In a software operating system that provides a software component for use by a plurality of software programs, a method of providing an upgraded version of said software component for use by at least one of said plurality of software programs without taking other software programs of said plurality that will not use the upgrade out of service, said method comprising the steps of:

providing a first version of said software component with a first file name and a plurality of software programs that use said first version of said software component;

providing an upgraded version of said software component;

assigning a second file name to said upgraded software component; storing an upgraded version of said software component with a second file name in a directory;

shutting down only said at least one software program of said plurality that will use said upgraded software component with said second file name while the other software programs of said plurality that will not use said upgraded software component with said second file name are running and then;

reconfiguring said at least one shut down software program to operate with said upgraded software component with said second file name;

running said reconfigured software program; and linking said running reconfigured software program to said software component having said second file name.

10. The method of claim 9 wherein said step of shutting down a software program comprises the step of shutting down at least two software programs and reconfiguring said at least two software programs to operate with said upgraded software components.

11. The method of claim 9 wherein at least one of said plurality of software programs continues to operate with said software component identified by said first file name.

12. The method of claim 10 wherein at least one of said plurality of software programs continues to operate with said software component identified by said first file name.

13. The method of claim 9 wherein said software programs operate with a Windows® operating system that includes extensions at the end of file names to include the file type, and said COM is selected from the group of file types having extensions consisting of .EXE and .DLL.

* * * * *